United States Patent [19]

Mickleson

[11] 4,256,374
[45] Mar. 17, 1981

[54] WRITE AND READ OBJECTIVE LENS FOR HIGH DENSITY STORAGE

[75] Inventor: Lee Mickleson, Long Beach, Calif.

[73] Assignee: MCA Discovision, Inc., Universal City, Calif.

[21] Appl. No.: 25,803

[22] Filed: Apr. 2, 1979

[51] Int. Cl.³ .............................................. G02B 9/34
[52] U.S. Cl. ................................... 350/472; 350/469
[58] Field of Search ................ 350/175 ML, 220, 223

[56] References Cited

U.S. PATENT DOCUMENTS 3,592,530  7/1971  Klein .............................. 350/220 X Primary Examiner—John K. Corbin
Assistant Examiner—Scott J. Sugarman
Attorney, Agent, or Firm—Ronald J. Clark

[57] ABSTRACT

A write and read objective lens for encoding and recovery of information upon a storage member comprising three single lenses and one achromatic doublet for which the working distance is large, flatness of field and resolving power are high and utilizable with a plurality of wavelengths of light.

3 Claims, 13 Drawing Figures

FIG. 2A  TANGENTIAL  100% OF CLEAR APERTURE  SAGITTAL

FIG. 2B  67% OF CLEAR APERTURE

FIG. 2C  ON AXIS

TANGENTIAL   100% OF CLEAR APERTURE   SAGITTAL

67% OF CLEAR APERTURE

ON AXIS

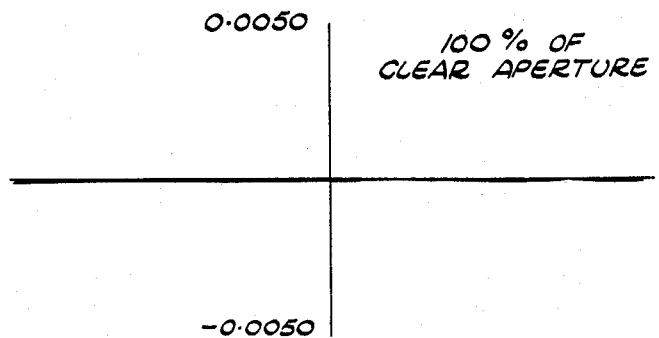
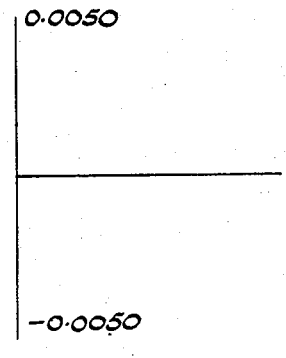
FIG.2G
FIG.2H
FIG.2I

TANGENTIAL SAGITTAL 0.50 — 100% OF CLEAR APERTURE    0.50

-0.50    -0.50

FIG. 2J 0.50    67% OF CLEAR APERTURE    0.50

-0.50    -0.50

FIG. 2K 0.50    ON AXIS    0.50

-0.50    -0.50

FIG. 2L

WRITE AND READ OBJECTIVE LENS FOR HIGH DENSITY STORAGE

BACKGROUND OF THE INVENTION

1. Field of the Invention

The present invention relates to a write and read objective lens for encoding and recovery of information upon a storage member and, more particularly, to a write and read objective lens for the encoding of high-density information upon a storage member, and further, a write and read objective for the recovery of high-density information which is optically encoded on a storage member.

2. Description of the Prior Art

For a write and read objective lens for encoding and recovery of information upon a storage member, it is necessary that the write and read objective for encoding and recovery of information on a storage member be utilizable with a plurality of wavelengths of light. This is required due to the use of the write and read objective lens as both the encoding objective lens and further as a reproducing lens for the recovery of the encoded information, the specific requirements for encoding and recovery differ greatly. A write objective lens must be of a high numerical aperture to provide a minimum spot size at the object, this provides for the highest signal to noise ratio of the recorded information and further provides a higher storage density of information upon the storage member.

To provide the maximum available power through the objective lens for use in encoding information, the objective lens must be as transparent as possible at the wavelength of light provided for the encoding of information ($\Lambda = 4420$ nm). This can be accomplished by providing a multi-layer, anti-reflection coating on the lens surfaces. For an objective lens to be used in reproducing systems of encoded information, it is required to guarantee a resolving power of at least $1\mu$ due to the fact that the objective lens must recover the very small signals recorded at a high density. Moreover, the information recovered from the disc, which rotates at high speed, provides information for directing the objective lens to follow the recorded track, information for automatic focusing in addition to the stored video information. To insure that the objective lens recovers those kinds of information correctly, the flatness of field focussed by the objective lens should be high. To prevent the objective lens from contacting the storage member which would result in the destruction of the storage member and the objective lens, the working distance of the objective lens should be long.

Further, to accomplish automatic focussing, the objective lens should be compact and light in weight. As the light source provided for generation of light provided to the objective lens for recovery of information is generally of the monochromatic type ($\Lambda = 6328$ nm), it is effective for increasing the signal to noise ratio of the recovered signal as amplified after recovery by a photo detector that the objective lens be as highly transparent to light of this wavelength as possible. Therefore, to increase the transparency, it is necessary to provide a multi-layer, anti-reflection coating on the lens surfaces and to minimize the number of lenses constituting the objective lens.

SUMMARY OF THE INVENTION

It is, therefore, a primary object of the present invention to provide a write and read objective lens for encoding and recovery of information upon a storage member which is utilizable at a plurality of wavelengths of light and further provide a large working distance and high flatness of field and resolving power.

As shown in FIG. 1, the write and read objective lens for encoding and recovery of information is a lens system comprising a first, second, third and fourth lens, said first lens being a positive meniscus lens with its concave surface positioned toward the object side, said second lens being a positive achromatic doublet, said third lens being a negative meniscus lens with its convex surface positioned toward the object side and said fourth lens being a positive lens. The write and read objective lens for encoding and recovery of information upon a storage member satisfies the following conditions when reference symbol f represents the focal length of the lens system as a whole. Reference symbol $f_3$ represents the focal length of the third lens, reference symbol $f_4$ represents the focal length of the fourth lens, reference symbol $r_6$ represents the radius of curvature of the surface on the image side of the second lens, reference symbol $r_7$ represents the radius of curvature of surface on the object side of the third lens, reference symbol $d_1$ represents the thickness of the first lens and reference symbol $d_7$ represents the thickness of the third lens.

| | | |
|---|---|---|
| 1. | $1.24 \geq r_6/f$ | $\geq 1.17$ |
| 2. | $0.46 \geq d_1/f$ | $\geq 0.37$ |
| 3. | $0.27 \geq |r_6|/|r_7|$ | $\geq 0.21$ |
| 4. | $1.20 \geq |f_3|/|f_4|$ | $\geq 1.00$ |
| 5. | $0.45 \geq d_5/f$ | $\geq 0.40$ |

When in the lens system of the above-mentioned configuration, $r_6/f$ becomes larger than the upper limit of the condition (1), i.e., $r_6f > 1.24$ distortion will increase and spherical aberration in the zonal and marginal portions will be overcorrected. When, on the contrary, $r_6/f$ becomes smaller than the lower limit, i.e., $r_6f < 1.17$, astigmatism will be undercorrected. When $d_1/f$ in the condition (2) becomes $d_1/f > 0.46$, the working distance becomes short and it becomes impossible to attain the object of the present invention. Moreover, spherical aberration will be undercorrected and the astigmatic difference becomes large. When, on the contrary, it becomes $d_1/f < 0.37$, coma and spherical aberration in the marginal portion will become unfavorable though the working distance becomes large. It is this condition which corrects additional spherical aberrations introduced by subsequent elements interposed in the long conjugate of the objective lens. If it becomes $|r_6|/|r_7| > 0.27$, in the condition (3), spherical aberration and coma will be overcorrected. If it become $|r_6|/|r_7| < 0.21$, coma will be somewhat undercorrected. If it becomes $|f_3|/|f_4| > 1.20$ in the condition (4), coma and spherical aberration in the marginal portion will become large. If it becomes $|f_3|/|f_4| < 1.00$, symmetry of coma will become unfavorable. Moreover, astigmatism will be undercorrected and will increase in a negative direction toward the marginal portion. If, in the condition (5), it becomes $d_5/f > 0.45$, spherical aberration will be somewhat overcorrected and, at the same time, the astigmatic difference becomes large. If, on the contrary, it becomes $d_5/f<0.40$, coma will be somewhat overcorrected.

BRIEF DESCRIPTION OF THE DRAWINGS

EMBODIMENT 1

Figure 1:
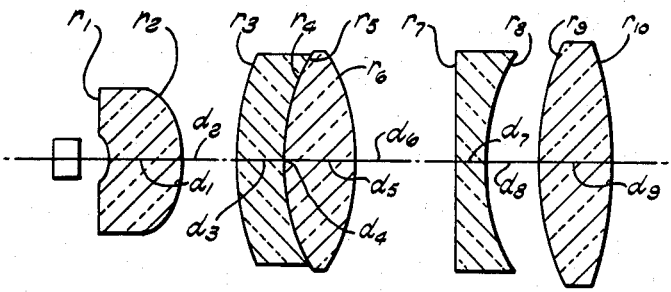
Figure 2D:
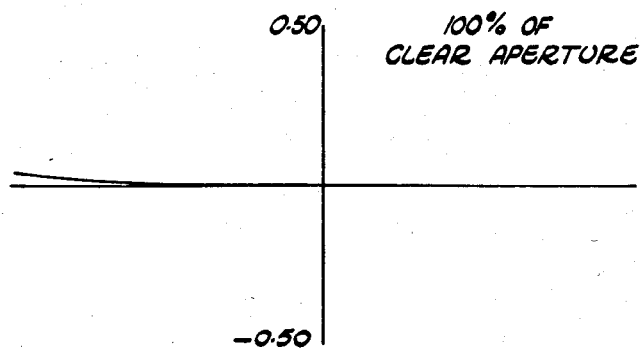
Figure 2D:
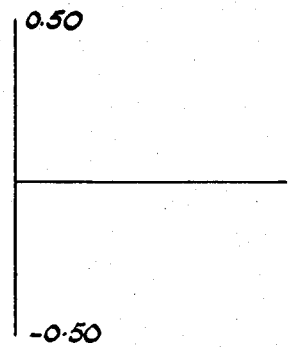
Figure 2E:
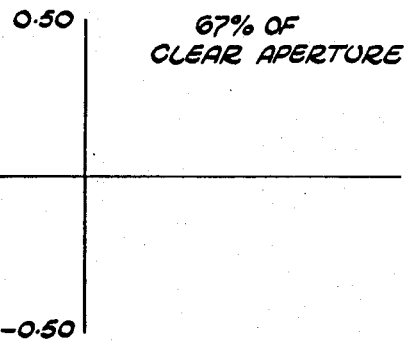
Figure 2E:
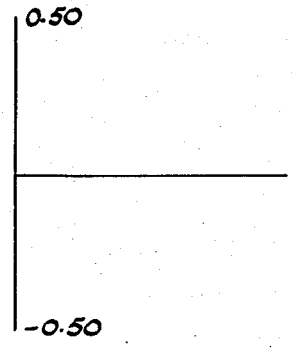
Figure 2F:
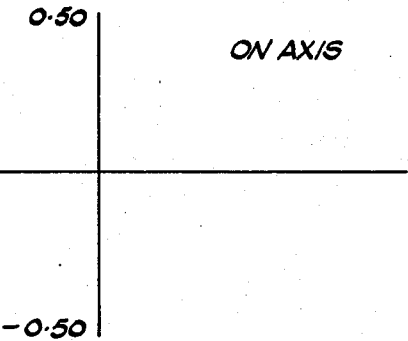
Figure 2F:
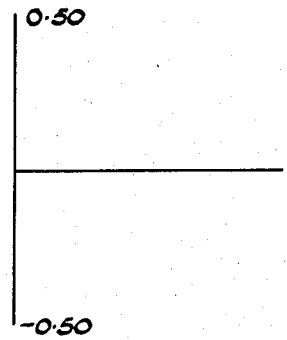

FIG. 1 shows a sectional view of the objective lens according to the present invention; and FIGS. 2a, 2b, 2c, 2d, 2e, 2f, 2g, 2h, 2i, 2j, 2k, and 2l, respectively, show graphs illustrating aberration curves of the present invention.

DETAILED DESCRIPTION OF THE PREFERRED EMBODIMENT

The preferred embodiment of the write and read objective lens for use with a wavelength of light suitable for the encoding of information upon a storage member is as follows:

---

$r_1 = -6.5338$
  $d_1 = 3.9509$ $n_1 = 1.7401$ $v_1 = 44.77$
$r_2 = -4.6723$
  $d_2 = 3.2154$
$r_3 = 21.6825$
  $d_3 = 2.0000$ $n_2 = 1.7980$ $v_2 = 25.43$
$r_4 = 12.0589$
  $d_4 = 0.0000$
$r_5 = +12.0589$
  $d_5 = 3.8669$ $n_3 = 1.4992$ $v_3 = 56.41$
$r_6 = -10.9260$
  $d_6 = 5.2846$
$r_7 = +44.0165$
  $d_7 = 1.5000$ $n_4 = 1.7490$ $v_4 = 27.58$
$r_8 = +11.2958$
  $d_8 = 1.8043$
$r_9 = +14.7279$
  $d_9 = 3.4780$ $n_5 = 51.48$ $v1.548\ 5 = 64.17$
$r_{10} = -26.4865$
  $f = 8.9494$ $f_3 = 19.8969$ $f_4 = -17.8722$
  $1 = 1.5$
  RMS WAVEFRONT ERRORS .0029

---

EMBODIMENT 2

The preferred embodiment of the write and read objective lens for use with a wavelength of light suitable for the recovery of high density information upon a storage member is as follows:

---

$r_1 = -6.5338$
  $d_1 = 3.9509$ $n_1 = 1.7637$ $v_1 = 44.77$
$r_2 = -4.6723$
  $d_2 = 3.2154$
$r_3 = +21.6825$
  $d_3 = 2.0000$ $n_2 = 1.8442$ $v_2 = 25.43$
$r_4 = +12.0589$
  $d_4 = 0.0000$
$r_5 = +12.0589$
  $d_5 = 3.8669$ $n_3 = 1.5117$ $v_3 = 56.41$
$r_6 = -10.9260$
  $d_6 = 5.2846$
$r_7 = +44.0165$
  $d_7 = 1.5000$ $n_4 = 1.7887$ $v_4 = 27.58$
$r_8 = +11.2958$
  $d_8 = 1.8043$
$r_9 = +14.7279$
  $d_9 = 3.4780$ $n_5 = 1.5260$ $v_5 = 64.17$
$r_{10} = -26.4865$
  $f = 9.1383$ $f_3 = 18.8846$ $f_4 = -17.4855$
  $1 = 1.5$
  RMS WAVEFRONT ERRORS = .0063

---

In the above-mentioned embodiments, reference symbols $r_1$ through $r_{10}$, respectively, represent radii of curvature of respective lens surfaces. Reference symbols $d_1$ through $d_9$, respectively, represent thicknesses of respective lenses and air spaces between respective lenses. Reference symbols $n_1$ through $n_5$, respectively, represent refractive indices of respective lenses. Reference symbols $v_1$ through $v_5$, respectively, represent Abbe's numbers of respective lenses. Reference symbol f represents the focal length of the lens system as a whole. Reference symbol $f_3$ represents the focal length of the third lens. Reference symbol $f_4$ represents the focal length of the fourth lens and reference symbol 1 represents the working distance of the lens system. As explained in the above, the lens system according to the present invention fully satisfies the requirements for a reproducing objective lens for videodiscs. This is also evident from the favorably corrected aberrations shown in respective graphs of aberration curves.

What is claimed is:

1. A write and read objective lens for encoding and recovery of information upon a storage member comprising a first, second, third and fourth lens, said first lens being a positive meniscus lens with its concave surface positioned toward the object side, said second lens being a positive achromatic doublet, said third lens being a negative meniscus lens with its convex surface positioned toward the object side, said fourth lens being a positive lens,, said write and read objective lens for encoding and recovery of information upon a storage member being utilizable with a plurality of wavelengths of light, said write and read objective for encoding and recovery of information upon a storage member satisfying the following conditions:

| | | |
|---|---|---|
| 1. | $1.24 \geq r_6/f$ | $\geq 1.17$ |
| 2. | $0.46 \geq d_1/f$ | $\geq 0.37$ |
| 3. | $0.27 \geq |r_6|/|r_7|$ | $\geq 0.21$ |
| 4. | $1.20 \geq |f_3|/|f_4|$ | $\geq 1.00$ |
| 5. | $0.45 \geq d_5/f$ | $\geq 0.40$ | wherein reference symbol f represents the focal length of the lens system as a whole, reference symbol $f_3$ represents the focal length of the third lens, reference symbol $f_4$ represents the focal length of the fourth lens, reference symbol $r_6$ represents the radius of curvature of the surface on the image side of the second lens, reference symbol $r_7$ represents the radius of curvature of surface on the object side of the third lens, reference symbol $d_1$ represents the thickness of the first lens and reference symbol $d_5$ represents the thickness of the third lens.

2. A write and read objective lens for encoding and recovery of information upon a storage member as claimed in claim 1, in which said write and read objective lens for encoding and recovery of information upon a storage member is utilizable at a wavelength of light suitable for encoding information upon a storage member and having the following numerical data:

---

$r_1 = -6.5338$
  $d_1 = 3.9509$ $n_1 = 1.7401$ $v_1 = 44.77$
$r_2 = -4.6723$
  $d_2 = 3.2154$
$r_3 = +21.6825$
  $d_3 = 2.0000$ $n_2 = 1.7980$ $v_2 = 25.43$
$r_4 = +12.0589$
  $d_4 = 0.0000$
$r_5 = +12.0589$
  $d_5 = 3.8669$ $n_3 = 1.4992$ $v_3 = 56.41$
$r_6 = -10.9260$
  $d_6 = 5.2846$
$r_7 = +44.0165$

-continued $d_7 = 1.5000$  $n_4 = 1.7490$  $\nu_4 = 27.58$
$r_8 = +11.2958$
$d_8 = 1.8043$
$r_9 = +14.7279$
$d_9 = 3.4780$  $n_5 = 1.548$  $\nu_5 = 64.17$
$r_{10} = -26.4865$
$f = 8.9494$  $f_3 = 19.8969$  $f_4 = -17.8722$
$l = 1.5$
RMS WAVEFRONT ERRORS .0029 wherein reference symbol $r_1$ through $r_{10}$, respectively, represents radii of curvature of respective lens surfaces, reference symbols $d_1$ through $d_9$, respectively, represent thickness of respective lenses and airspaces between respective lenses, reference symbols $n_1$ through $n_5$, respectively, represents refractive indices of respective lenses, reference symbols $\nu_1$ through $\nu_5$, respectively, represents Abbe's numbers of respective lenses, reference symbol f represents the focal length of the lens system as a whole, reference symbol $f_3$ represents the focal length of the third lens, reference symbol $f_4$ represents the focal length of the fourth lens and reference symbol l represents the working distance of the lens system.

3. A write and read objective lens for encoding and recovery of information upon a storage member as claimed in claim 1, in which said write and read objective lens for encoding and recovery of information upon a storage member is utilizable at a wavelength of light suitable for recovery of information upon a storage member and having the following numerical data:

$r_1 = -6.5338$
$d_1 = 3.9509$  $n_1 = 1.7637$  $\nu_1 = 44.77$
$r_2 = -4.6723$
$d_2 = 3.2154$
$r_3 = +21.6825$
$d_3 = 2.0000$  $n_2 = 1.8442$  $\nu_2 = 25.43$
$r_4 = +12.0589$
$d_4 = 0.0000$
$r_5 = +12.0589$
$d_5 = 3.8669$  $n_3 = 1.5117$  $\nu_3 = 56.41$
$r_6 = -10.9260$
$d_6 = 5.2846$
$r_7 = +44.0165$
$d_7 = 1.5000$  $n_4 = 1.7887$  $\nu_4 = 27.58$
$r_8 = +11.2958$
$d_8 = 1.8043$
$r_9 = +14.7279$
$d_9 = 3.4780$  $n_5 = 1.5260$  $\nu_5 = 64.17$
$r_{10} = -26.4865$
$f = 9.1383$  $f_3 = 18.8846$  $f_4 = -17.4855$
$l = 1.5$
RMS WAVEFRONT ERRORS = .0063 wherein reference symbols $r_1$ through $r_{10}$, respectively, represent radii of curvature of respective lens surfaces, reference symbols $d_1$ through $d_9$, respectively, represent thicknesses of respective lenses and air-spaces between respective lenses, reference symbols $n_1$ through $n_5$, respectively, represent refractive indices of respective lenses, reference symbols $\nu_1$ through $\nu_5$, respectively, represents Abbe's numbers of respective lenses, reference symbol f represents the focal length of the lens system as a whole, reference symbol $f_3$ represents the focal length of the third lens, reference symbol $f_4$ represents the focal length of the fourth lens and reference symbol l represents the working distance of the lens system.

* * * * *